Patented Mar. 2, 1954

2,671,070

UNITED STATES PATENT OFFICE 2,671,070

REACTION PRODUCTS OF DICYCLOPENTADIENE, MALEIC ANHYDRIDE, AND A GLYCOL, AND COPOLYMERS THEREOF

Robert L. Knapp, Naugatuck, Conn., assignor to United States Rubber Company, New York, N. Y., a corporation of New Jersey No Drawing. Application December 8, 1951, Serial No. 260,763

7 Claims. (Cl. 260—45.4)

This invention relates to novel polymerizable compositions and the resulting resins.

More particularly, it is concerned with providing a superior fusible alkyd type resinous composition which can be copolymerized with a copolymerizable unsaturated ethylenic chemical comprising $CH_2=C<$, such as styrene.

An object of the invention is to provide such an alkyd type resin which lends itself admirably to reaction with said ethylenic chemicals, whereby to provide a hard resinous product having relatively high heat distortion properties and good resistance to degradation at elevated temperatures. Another object of the invention is to provide a process of making such an alkyd type resin which process is economical and which obviates the use of superatmospheric pressure in carrying out the reaction. Other objects will be apparent from the hereinafter description.

According to the invention, the improved alkyd type resin is made from heating and simultaneously reacting together a glycol such as ethylene glycol, an alpha, beta-unsaturated alpha, beta-dicarboxylic acid such as maleic acid or its anhydride, and dicyclopentadiene. From experimentation and test, it has been found that the superior properties of the resulting resin is due to the use of the dicyclopentadiene within a narrow molar range based on the said dicarboxylic acid or anhydride. Specifically, the limits are from about 0.3 to about 0.4 moles of the dicyclopentadiene per mole of the acid such as maleic acid or its anhydride. The acid number of the alkyd may range from about 20 to about 80. At least one mole proportion of the glycol per mole of acid is used. In practice sufficient excess of the glycol is used to insure substantially esterification of the acid that is present; up to 20 mole-percent of the glycol is economically feasible.

Temperatures of reaction may range from about 140° C. to 220° C. correlative with the time employed.

Just what takes place during the reaction is difficult to determine. However, it is known that the same results do not follow from reacting a preformed adduct of cyclopentadiene and maleic anhydride (which is known chemically as endomethylene tetrahydrophthalic anhydride, or briefly as carbic acid anhydride) in admixture with a glycol, such as ethylene glycol, and maleic anhydride. This is shown by the following data.

| | Carbic Anhydride, mols | Dicyclopentadiene, mols | Maleic Anhydride, mols | Ethylene Glycol, mols |
|---|---|---|---|---|
| 1 | 0.6 | | 0.4 | 1.05 |
| 2 | | 0.3 | 1.0 | 1.05 |

The alkyds were prepared in the same manner by heating to 150° C.–160° C. for one hour and then at a range of 190° C.–200° C. for about three hours to bring the acid number of the alkyd to about 45. The entire heating is done under an atmosphere of carbon dioxide.

The alkyds are then mixed with one-half their weight of styrene and cured at 80° C. with 1.5% benzoyl peroxide based on the total weight of polymerizable material.

| Example | Rockwell Hardness on the M Scale | ASTM Heat[1] Distortion | Cure Rate at 80° C. |
|---|---|---|---|
| 1 | Too soft | Flexible | 700 sec. |
| 2 | 115 | 130° C | 311 sec. |

[1] Temperature at which a dimensional piece is distorted a set amount.

The effect of variation in the molar ratio of the dicyclopentadiene in preparing the improved resin is shown by the following examples:

ALKYD COMPOSITION

| | Ex. 3 | Ex. 4 | Ex. 5 | Ex. 6 |
|---|---|---|---|---|
| Maleic anhydride (mols) | 1 | 1 | 1 | 1 |
| Dicyclopentadiene (mols) | 0.5 | 0.4 | 0.3 | 0.2 |
| Ethylene glycol (mols) | 1.05 | 1.05 | 1.05 | 1.05 |

RESIN BLEND COMPOSITION

| | Ex. 3 | Ex. 4 | Ex. 5 | Ex. 6 |
|---|---|---|---|---|
| Alkyd (weight percent) | 66 | 66 | 66 | 66 |
| Styrene (weight percent) | 34 | 34 | 34 | 34 |
| Hydroquinone (p. p. m.) | 100 | 100 | 100 | 100 |
| Cure Rate at 80° C., sec. (with 1.5% benzoyl peroxide) | >550 | 330 | 311 | (1) |
| Rockwell Hardness, M Scale | 111 | 112 | 115 | (1) |
| ASTM Heat Distortion | <75 | 100 | 130 | (1) |

[1] This alkyd-styrene combination separates into two layers. If a cure is attempted a hard, brittle layer (mostly polystyrene) is formed on top and a soft layer (mostly alkyd) on the bottom.

The results obtained in Example 3 and Example 6 are unsatisfactory, while those in Example 4 and Example 5 are eminently satisfactory, from the standpoint of hardness, heat distortion temperature, and rate of cure (copolymerization).

The copolymer resin obtained, respectively, from the resin blend of styrene and alkyd identified in Example 4 and Example 5, when tested as an impregnant, using glass cloth as a reinforcing material, showed that at 300° F. they had remarkably high retention of flexural strength compared with other commercial styrene copolymer resins.

In the above examples 3 to 6, the glycol, anhydride, and dicyclopentadiene were charged into a standard alkyd reaction vessel which is open to the atmosphere and an inert gas such as carbon dioxide was bubbled through the mixture during the entire reaction to prevent oxygen from coming into contact with the hot mass and to aid in removing the water that is formed. The mixture was heated at 150° C. to 160° C. for about one hour, and the temperature was then raised to 190° C.–200° C. for about three hours so as to bring the acid number to about 45. The entire operation was carried out under atmosphere pressure. The alkyd was then cooled and the hydroquinone and the styrene then added. Instead of using hydroquinone, other known inhibitors of polymerization may be used. Further, the mixtures or blends of the styrene and the alkyd can be thus stored safely at ordinary temperatures for an extended period of time, if desired.

In curing, i. e., copolymerizing, the copolymerizable mixture, the cures can be easily effected by the addition of 1.5% of benzoyl peroxide, or other peroxidic catalyst, at temperatures ranging from about 80 to about 110° C.

In the above blend, the proportion of the ethylenic or styrene monomer, to alkyd, can be varied widely. The alkyd in the blend may range from 90 to 10% by weight, and the comonomer, such as styrene, may correspondingly range from 10 to 90% by weight of the mixture.

Instead of using styrene as a cross-linking agent, there may be used chlorinated styrenes, or triallyl cyanurate.

Instead of using ethylene glycol, other glycols having hydroxyl groups in adjacent carbon atoms, and having from 2 to 4 carbon atoms in the chain, such as propylene glycol, butanediol-1,2, butanediol-2,3, may be used.

Optionally, modifying agents may be added, if desired, to the above mixture for forming the alkyd without materially effecting the end result, such as small amounts up to about 30 mole-percent of phthalic anhydride, chlorinated phthalic anhydrides, such as tetrachlorophthalic anhydride, etc.

Having thus described my invention, what I claim and desire to protect by Letters Patent is:

1. A heat reaction product of a mixture consisting essentially of a glycol, an acidic material selected from the class consisting of maleic acid and its anhydride, and dicyclopentadiene, the mol ratio of the glycol to the acidic material being at least one-to-one, the mol ratio of the dicyclopentadiene to the acidic material being in the range from about 0.3 to about 0.4 mol per mol of the acidic material, said reaction being at a temperature in the range of about 140° C. to about 220° C.

2. A resinous heat reaction product of a mixture consisting essentially of ethylene glycol, maleic anhydride, and dicyclopentadiene, the mol ratio of the glycol to the acidic material being at least one-to-one, the mol ratio of the dicyclopentadiene to the acidic material being in the range from about 0.3 to about 0.4 mol per mol of the acidic material, said reaction being at a temperature in the range of about 140° C. to about 220° C.

3. An alkyd type resin having an acid number from about 20 to about 80 which is the product of reaction at a temperature in the range from about 140° C. to about 220° C., of a mixture consisting essentially of ethylene glycol, maleic anhydride, and dicyclopentadiene, the mol ratio of the glycol to the maleic anhydride being at least one-to-one, the mol ratio of the dicyclopentadiene to the anhydride being in the range from about 0.3 to about 0.4 mol per mol of the anhydride.

4. A copolymer resin obtained from copolymerizing a fusible resinous alkyd, as set forth in claim 3, with a copolymerizable unsaturated ethylenic compound including the group $CH_2=C<$.

5. A copolymer resin obtained from copolymerizing a fusible resinous alkyd, as set forth in claim 3, with styrene.

6. A process which comprises heating at a temperature in the range from about 140° C. to about 220° C. and simultaneously reacting a mixture consisting essentially of at least one mol proportion of a glycol, one mol proportion of maleic anhydride, and about 0.3 to about 0.4 mol proportions of dicyclopentadiene.

7. A copolymer resin obtained from copolymerizing a fusible resinous alkyd, as set forth in claim 3, with triallyl cyanurate.

ROBERT L. KNAPP.

References Cited in the file of this patent

UNITED STATES PATENTS

| Number | Name | Date |
| --- | --- | --- |
| 2,047,398 | Voss et al. | July 14, 1936 |
| 2,235,447 | Bradley et al. | Mar. 18, 1941 |
| 2,387,895 | Gerhart | Oct. 30, 1945 |
| 2,404,836 | Gerhart et al. | July 30, 1946 |
| 2,475,731 | Weith | July 12, 1949 |
| 2,577,005 | Giacomo | Dec. 4, 1951 |